(12) United States Patent
Sengupta et al.

(10) Patent No.: US 6,358,386 B1
(45) Date of Patent: Mar. 19, 2002

(54) MULTILAYERED CONFORMAL COATINGS OF TUNABLE, LOW ELECTRONIC LOSS CERAMIC COMPOSITES AND METHOD OF PRODUCTION

(75) Inventors: Louise Sengupta; Somnath Sengupta, both of Ellicott City; Eric Ngo, Belcamp, all of MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 14 days.

(21) Appl. No.: 09/654,832

(22) Filed: Sep. 1, 2000

(51) Int. Cl.[7] ............................................... C25D 13/02
(52) U.S. Cl. ...................... 204/489; 204/490; 205/333
(58) Field of Search .......................... 205/333; 204/489, 204/490

(56) References Cited

U.S. PATENT DOCUMENTS 5,635,048 A * 6/1997 Lu et al. ..................... 204/490

* cited by examiner

Primary Examiner—Arun S. Phasge
(74) Attorney, Agent, or Firm—Paul S. Clohan, Jr.

(57) ABSTRACT

A method of producing multilayered conformal coatings of tunable, low electronic loss ceramic composites is carried out by mixing two-phase BSTO/MgO into a base solution of typical lab grade acetone to form a mixed solution, inserting two platinum sheets separated into the mixed solution, applying a constant direct current (DC) bias across the two platinum sheets acting as electrodes, and stirring to reduce sedimentation of particles using a magnetic stirrer. Deposition is also performed on insulating substrates by initially coating them with conducting films of Au, performing BSTO deposition, and subsequently sintering the dielectric film so that the underlying metal film evaporates.

26 Claims, 1 Drawing Sheet

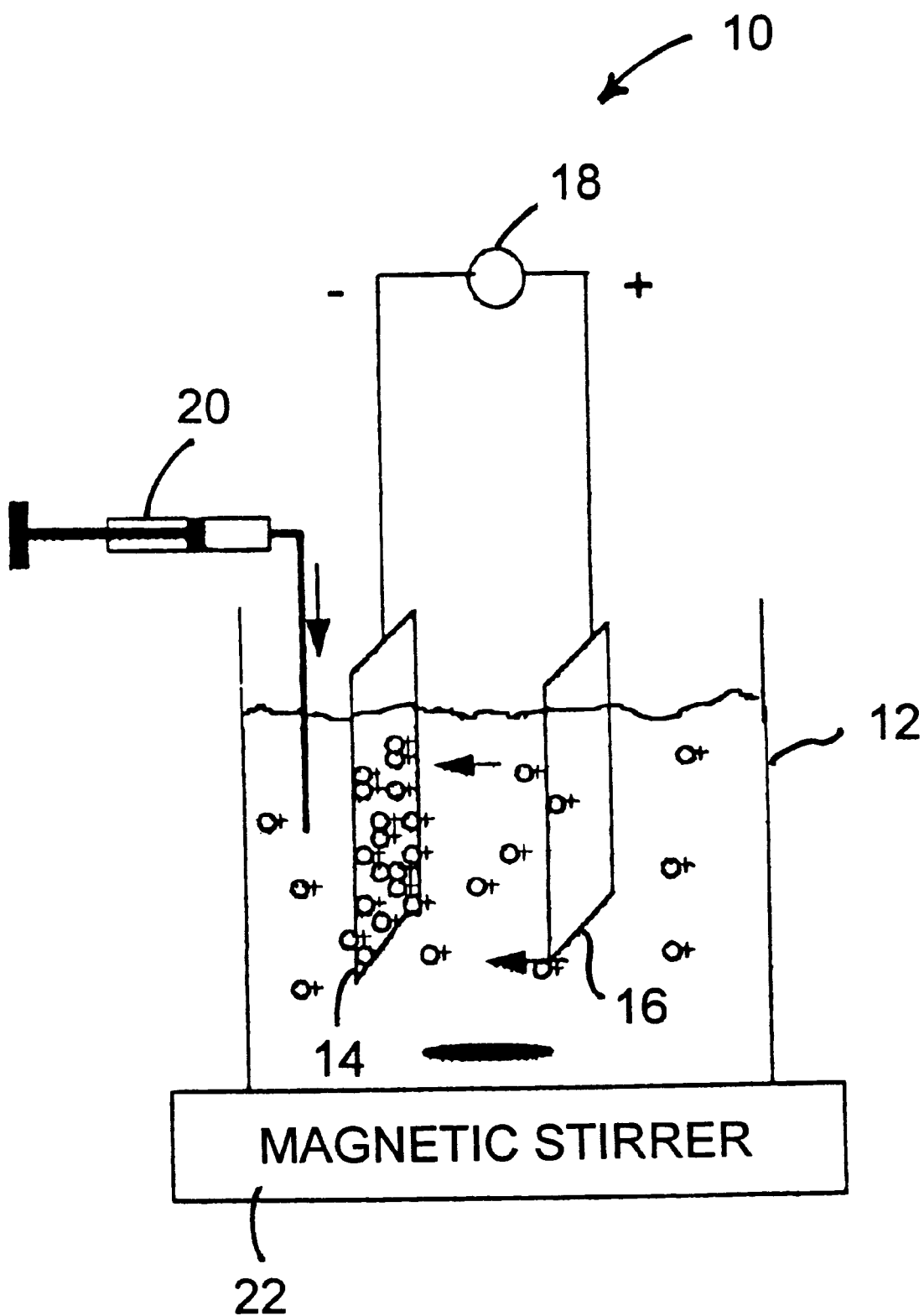

MULTILAYERED CONFORMAL COATINGS OF TUNABLE, LOW ELECTRONIC LOSS CERAMIC COMPOSITES AND METHOD OF PRODUCTION

BACKGROUND OF THE INVENTION

1. Field of the Invention

The present invention generally relates to multilayered conformal coatings of tunable, low electronic loss ceramic composites and method of production thereof. More particularly, the invention relates to a method of producing multilayered conformal coatings of tunable, low electronic loss ceramic composites wherein the method, preferably, comprises an electrophoretic deposition (EPD) method.

In accordance with the invention, ceramic composites of barium strontium titanium oxide ($Ba_{0.60}Sr_{0.40}TiO_3$) and magnesium oxide (MgO) are used to produce multilayered conformal coatings of tunable, low electronic loss ceramic composites. However, other tunable, low loss ceramic composites can also be produced in the above-mentioned forms utilizing the method of the present invention.

2. Description of the Prior Art

The EPD method has been used to deposit ferroelectric ceramics and other materials. For example, U.S. Pat. No. 2,843,541 mentions the use of EPD for ferroelectric materials.

Since the issuance of that patent, the EPD method has been utilized successfully by other groups to deposit and produce devices for high temperature, super conducting materials, pyroelectric materials, and dielectric capacitors. For example, U.S. Pat. No. 4,952,557—Schmidt et al. and U.S. Pat. No. 5,262,026—Nojima et al. disclose the production of high temperature superconducting materials. U.S. Pat. No. 4,500,397—Mori et al. discloses the production of pyroelectric materials. Finally, U.S. Pat. No. 5,382,928—Davis et al. discloses the production of dielectric capacitors.

However, up to this point, there has not been a method of producing multilayered conformal coatings of tunable, low electronic loss ceramic composites, and more particularly the use of an EPD method to develop such multilayered conformal coatings. As disclosed in U.S. Pat. No. 5,427,988—Sengupta et al., composites of barium strontium titanium oxide and magnesium oxide have demonstrated electronic properties which are very useful for antenna applications. These properties include (but are not limited to) electronically variable dielectric constants and low loss of energy in the material. Furthermore, variations of these composites have also been demonstrated to have excellent pyroelectric properties for sensor applications.

Nevertheless, up to this point, there has not been a method which is both valuable and inexpensive in producing thick films of these materials such that they can be used for applications at frequencies which call for material thicknesses of one micron to several microns. Moreover, up to this point, the deposition conditions for such mutliphase composites have not been discovered or known.

SUMMARY OF THE INVENTION

The present invention generally relates to multilayered conformal coatings of tunable, low electronic loss ceramic composites and a method of production thereof. In particular, the invention relates to a method (specifically, an EPD method) for producing ceramic composites in an inexpensive manner to produce thick films of materials. Notably, the inventive method results in the deposition of material films of such thickness that they can be used in antenna or sensor applications, and can be used for applications of frequencies calling for material thickness of one micron to several microns. Finally, the invention is carried out under deposition conditions for multiphase composites, which deposition conditions are necessary in order to obtain the dielectric properties required for antenna and other tunable device applications.

The method of depositing conformal thin films of low loss materials basically comprises the steps of providing a base solution, mixing a multiphase composite powder with the base solution to obtain a mixed solution, inserting two sheet electrodes into the mixed solution, and applying a constant direct current (DC) bias voltage across the two sheet electrodes for a given period of time to deposit the conformal thin films of low loss materials. Preferably, the method is used to deposit the conformal thin films of low loss materials on an insulated substrate.

Therefore, it is a primary object of the present invention to provide multilayered conformal coatings of tunable, low electronic loss ceramic composites.

It is an additional object of the present invention to provide a method for producing such multilayered conformal coatings of tunable, low electronic loss ceramic composites.

It is an additional object of the present invention to provide ceramic composites of $Ba_{0.60}Sr_{0.40}TiO_3$ and MgO as tunable, low loss ceramic composites.

It is an additional object of the present invention to provide a valuable and inexpensive method for producing composites having excellent pyroelectric properties for sensor applications.

It is an additional object of the present invention to provide such components having electronic properties useful for antenna applications.

It is an additional object of the present invention to provide a method for producing thick film composites of materials such that they can be used for applications at frequencies which call for material thickness of one micron to several microns.

It is an additional object of the present invention to provide a method for producing multilayered conformal coatings having dielectric properties required for antenna and other tunable devices applications.

The above and other objects, and the nature of the invention, will be more clearly understood by reference to the following detailed description, the associated drawing, and the appended claims.

BRIEF DESCRIPTION OF THE DRAWINGS

The sole FIGURE is a schematic of an EPD arrangement for producing multilayered conformal coatings of tunable, low electronic loss ceramic composites in accordance with the present invention.

DETAILED DESCRIPTION OF THE INVENTION

The invention will be more clearly understood by reference to the following detailed description and the associated drawing.

The sole FIGURE is a schematic of an EPD arrangement for producing multilayered conformal coatings of tunable, low electronic loss ceramic composites in accordance with the present invention. As seen therein, the setup for conducting the EPD method in accordance with the present invention comprises an arrangement 10 which includes the following components: a container 12 for containing a liquid solution, electrodes 14 and 16 which are disposed within the container 12, a DC source 18 connected to the electrodes 14 and 16, a pipet 20 for introducing a substance into the container 12, and a magnetic stirrer 22 for stirring the mixture or solution contained within the container 12.

An example of the method of the present invention will now be described for deposition of a two phase composite of barium strontium titanium oxide and magnesium oxide. However, it is to be understood that the method of the present invention is applicable to other binary and ternary composites and doped materials. Thus, the method of the present invention is not limited to the specific example set forth below.

EXAMPLE

The FIGURE shows a standard setup for implementing the EPD method in accordance with the present invention. Calcined powder of two-phase BSTO/MgO is mixed into a known volume base solution of a typical lab grade of acetone within a container 12, two platinum sheets 14 and 16 being immersed into the solution. Preferably, the two platinum sheets 14 and 16 have the dimensions 1"×0.5"×0.001" and are separated by 0.5".

In this example, a study was conducted with respect to a constant ratio of 5000:1 of acetone versus dispersant. A constant DC bias of 100 volts was applied by source 18 between the electrodes 14 and 16 for 3–10 minutes. In addition, magnetic stirrer 22 was used to reduce sedimentation of particles in the solution. It should be noted, however, that time and voltage can be tailored to a desired deposition rate and thickness for each specific application of the method of the present invention. For example, one of the experiments conducted in accordance with the invention shows that, at 100 volts constant DC and 0.5" separation, a uniform thickness of a thick film of 10–12 microns can be deposited in four minutes, the rate of deposition then gradually reducing to zero as the solution reaches saturation.

In the above example, and related experiments, several dispersants were used for the purpose of experimental study, and such dispersants included JayFlex 77, Arsosol 22 Surfactant, Aerosol OT-S Surfactant, Nocospere, and Hypermer. Using an Electrokinetic Sonic Analyzer (ESA), the dispersant Aerosol OT-S Surfactant ($C_{20}H_{37}O_7NaS$) produces the highest zeta potential in the slurry, and yields most effective for this type of deposition.

In implementing the invention, a controlled pipette 20 injects the dispersant into the solution to start deposition. The deposition rate can be controlled by the ratio of solution and powder until saturation occurs, the current density ($mA/cm^2$) being maintained constant.

In addition, deposition was also performed on insulating substrates by initially coating with conducting films of Au, performing the barium strontium titanium oxide or BSTO deposition, and subsequently sintering the dielectric film, during which the underlying metal film evaporated.

Table I shows the dielectric properties of the BSTO thin films deposited by the EPD method. It shows that, through the EPD method, the novel properties of the material can be achieved. The dielectric constant is reduced through the addition of the MgO to the material matrix; the loss tangent is reduced as well. The essence of the invention thus lies in demonstrating, for the first time, a method of depositing conformal thin films of low loss materials.

The dielectric properties of BSTO/MgO film were measured in terms of the dielectric constant Er, loss tangent tan d, and % tenability V/$\mu$m. The small signal dielectric measurements were conducted on Metal-Insulator-Metal (MIM) capacitors by applying an alternating current (AC) signal of 10 mV amplitude. Internal DC bias source from an HP4294 Impedance Analyzer was generated up to 2V/$\mu$m to characterizing tunability (changes of dielectric constant at bias). Platinum electrodes with diameters of 0.02 cm were sputter-deposited through a shadow mask on the top of the surface of the film to create MIM form. The permitivity showed no appreciable dispersion with sweep frequency up to 1 MHz, proving that the values were not influenced by any surface layer effects or electrode and electrical contact issue at this frequency range.

TABLE I

Electronic Properties of BSTO/MgO Thin Film Deposited by EPD Method

| Sample | Dielectric Constant @ 1 MHz | Loss Tangent @ 1 MHz | % Tunability (V/$\mu$m) |
|---|---|---|---|
| $Ba_{.60}Sr_{.40}TiO_3$ | 603.3 | .029 | 17.34% @ 2 V/$\mu$m |
| $Ba_{.60}Sr_{.40}TiO_{3-}$ | 327.0 | .002 | 8% @ 2 V/$\mu$m |
| 20 Wt % MgO | | | |

While preferred forms and arrangement have been shown in illustrating the invention, it is to be understood that various changes and modifications can be made without departing from the spirit and scope of this disclosure.

What is claimed is:

1. A method of depositing conformal thin films of low loss materials, comprising:
   providing a base solution;
   mixing a multi-phase composite powder with the base solution to obtain a mixed solution;
   inserting two sheet electrodes into the mixed solution; and
   supplying a constant direct current (DC) bias voltage across the two sheet electrodes for a given period of time to deposit the conformal thin films of low loss materials.

2. The method of claim 1, wherein said base solution consists of acetone.

3. The method of claim 1, wherein said base solution consists of acetone and dispersant.

4. The method of claim 3, wherein said acetone and said dispersant are maintained at a constant ratio of 5000:1.

5. The method of claim 4, wherein said dispersant is selected from the class consisting of JayFlex 77, Arsosol 22 Surfactant, Aerosol OT-S Surfactant, Nocospere, and Hypermer.

6. The method of claim 1, wherein said base solution consists of 5000 parts acetone to one part dispersant.

7. The method of claim 1, wherein said multi-phase composite powder consists of calcined powder of two-phase BSTO/MgO.

8. The method of claim 1, wherein said electrodes comprise two platinum sheets separated by a given distance.

9. The method of claim 8, wherein said constant DC bias voltage is 100 volts and said given distance is 0.5 inches.

10. The method of claim 1, wherein said constant DC bias voltage is 100 volts.

11. The method of claim 10, wherein said given period of time is in the range of 3–10 minutes.

12. The method of claim 10, wherein the given distance by which the two platinum sheets are separated is 0.5 inches.

13. The method of claim 1, further comprising the step of stirring to reduce sedimentation of particles.

14. The method of claim 13, wherein said stirring step comprises using a magnetic stirrer.

15. The method of claim 1, wherein the base solution consists of acetone and a dispersant selected from the class consisting of JayFlex 77, Arsosol 22 Surfactant, Aerosol OT-S Surfactant, Nocospere, and Hypermer.

16. The method of claim 1, further comprising the step of injecting dispersant into the mixed solution to start deposition.

17. A low electronic loss ceramic composite formed by the method of claim 1.

18. A method of depositing conformal thin films of low loss materials on an insulating substrate, comprising the steps of:

coating the insulating substrate with a conducting film;

providing a base solution;

mixing a multi-phase composite with the base solution to form a mixed solution;

inserting the coated substrate and two electrodes into the mixed solution; and applying a direct current (DC) bias voltage across the two electrodes for a given period of time.

19. The method of claim 18, further comprising the step of sintering a dielectric film on the coated substrates to evaporate an underlying metal film.

20. The method of claim 18, wherein said acetone and said dispersant are maintained at a constant ratio of 5000:1.

21. The method of claim 18, wherein said DC bias voltage is 100 volts.

22. The method of claim 21, wherein said given period of time is in the range of 3–10 minutes.

23. The method of claim 21, wherein the two electrodes comprise two platinum sheets separated by 0.5 inches.

24. The method of claim 18, further comprising the step of stirring to reduce sedimentation of particles.

25. The method of claim 24, wherein said stirring step is carried out using a magnetic stirrer.

26. A low electronic loss ceramic composite formed by the method of claim 18.

* * * * *